United States Patent [19]
Enomoto

[11] Patent Number: 5,150,150
[45] Date of Patent: Sep. 22, 1992

[54] APPARATUS FOR PREVENTING IMAGE FROM BEING BLURRED IN CAMERA

[75] Inventor: Shigeo Enomoto, Tokyo, Japan

[73] Assignee: Asahi Kogaku Kogyo Kabushiki Kaisha, Tokyo, Japan

[21] Appl. No.: 577,554

[22] Filed: Sep. 5, 1990

[30] Foreign Application Priority Data

Sep. 6, 1989 [JP] Japan .................................. 1-230992
May 18, 1990 [JP] Japan .................................. 2-128922

[51] Int. Cl.⁵ ................................................ G03B 17/38
[52] U.S. Cl. ..................................... 354/456; 354/268
[58] Field of Search ............... 354/266, 268, 430, 456, 354/289.1, 289.12, 70, 202

[56] References Cited

U.S. PATENT DOCUMENTS

| | | | |
|---|---|---|---|
| 3,399,307 | 8/1968 | Levin ..................... | 354/430 |
| 3,690,234 | 9/1972 | Costianes ............... | 354/430 |
| 4,273,430 | 6/1981 | Fritsche et al. ......... | 354/430 |
| 4,389,111 | 6/1983 | Uchidoi et al. ......... | 354/268 X |
| 4,733,264 | 3/1988 | Hatase et al. .......... | 354/430 |
| 4,772,117 | 9/1988 | Matsui .................... | 354/430 X |
| 4,864,409 | 9/1989 | Platte et al. ........... | 358/222 |
| 4,901,096 | 2/1990 | Lemelson ............... | 354/268 |
| 4,965,619 | 10/1990 | Shikaumi et al. ....... | 354/430 X |

*Primary Examiner*—W. B. Perkey
*Attorney, Agent, or Firm*—Sandler, Greenblum & Bernstein

[57] ABSTRACT

An apparatus is provided for preventing an image from being blurred as it is being recorded on the film of a camera. Angular velocity sensors are provided for detecting the angular velocity applied to the camera, and an actuator is provided for actuating a shutter of the camera to correct for the movement of the camera when the absolute value of the angular velocity detected by the angular velocity sensors is below a predetermined value.

37 Claims, 12 Drawing Sheets

APPARATUS FOR PREVENTING IMAGE FROM BEING BLURRED IN CAMERA

BACKGROUND OF THE INVENTION

1. Field of the Invention

The present invention relates to an apparatus for preventing a blurring of an image on the film when a camera-shake is caused.

2. Description of Related Art

During manual photographing, a camera-shake (i.e., camera movement) tends to occur. This usually occurs when a camera is unstably held, when a picture of a dark object is taken at a slow shutter speed, or when a photographer moves while photographing. Such a camera shake causes streaking, resulting in a poor picture. On the one hand, camera-shake can be eliminated to some extent, from the viewpoint of hardware, by brightening a lens or increasing film sensitivity, thereby increasing the shutter speed. On the other hand, the stability of the camera during use depends on the skill of a photographer.

An existing blur prevention apparatus detects camera movement relative to the camera's optical axis as an angular velocity or angular acceleration applied to the camera, so that a corrective lens can be moved in a direction opposite to the direction of the displacement caused by the camera movement to cancel the displacement.

More specifically, this existing blur prevention apparatus has a sensor for detecting the amount and direction of displacement caused by the camera-shake and a drive and control system for moving and controlling the correcting lens, so that the corrective lens is moved in a direction opposite to the direction of the camera-shake by a displacement corresponding to the displacement caused by the camera-shake, thereby cancelling out the effect of the camera movement. There are various attempts to improve or develop this existing blur-prevention apparatus.

However, the drive and control system of the corrective lens hinders to the possible realization of a compact and small camera. The blurring of an image often occurs with beginners, who tend to use compact cameras. Because of the difficulty of incorporating the existing blur-prevention apparatus in a compact camera, another solution to the problem of blurring due to camera-shake is needed.

SUMMARY OF THE INVENTION

The primary object of the present invention is to respond to such a requirement by providing an apparatus for preventing an image from being blurred due to camera-shake but without using a conventional corrective lens.

The improvement of the present invention is directed first to the timing of the commencement of the shutter release, and second to the timing of the closure of the shutter.

According to one aspect of the present invention, when a camera-shake occurs, the shutter release is commenced only after the camera movement stops or is depressed to be within allowable limits. After camera-shake is detected, the shutter begins opening once the camera movement stops or is within allowable limits, thus eliminating the blur of image which would otherwise occur.

According to another aspect of the present invention, when a camera movement, beyond allowable limits, occurs after the shutter has already begun to open, the shutter is compulsively closed to eliminate the blur of image which would otherwise occur, even if no exposure in accordance with a detection signal of a photometer is completed.

According to the present invention, although the time of commencement of the shutter release is slightly delayed from a microscopical viewpoint, the delay is practically negligible, particularly to a beginner or intermediate user of a compact camera. Furthermore, although there is a slight underexposure as a result of the expedited closure of the shutter, the underexposure can be compensated for by the latitude of a film and a photographic paper, thereby still allowing the production of a high quality picture.

The delay of the commencement of the shutter release when camera-shake occurs and the compulsive closure of the shutter when the camera-shake occurs after the shutter has already begun opening are technically independent from one another. Accordingly, each one of the technical countermeasure can be independently adopted to achieve the object of the present invention. Preferably, however, both the countermeasures will be adopted in the present invention.

According to one aspect of the present invention, there is provided an apparatus for preventing an image from being blurred in a camera which includes at least one motion detection means for detecting a parameter representative of the amount of movement applied to the camera, and control means for controlling a shutter of a camera to be opened when the magnitude of the parameter detected by the motion detecting means is below a predetermined value. The parameter may comprises a value of velocity of the camera. Additionally, the velocity may be the angular velocity of the camera.

In accordance with another aspect of the present invention, there is provided an apparatus for preventing an image from being blurred in a camera, which includes at least one motion detecting means for detecting a parameter representative of the amount of movement applied to the camera, and an actuating device for actuating a shutter of the camera to be opened when the magnitude of the parameter detected by the motion detecting means is below a predetermined value.

According to yet another aspect of the present invention, there is provided at least one motion detector means for detecting at least one parameter representative of the amount of movement applied to the camera, detecting means for detecting whether the magnitude of the at least one parameter is below a predetermined value, and control means for controlling a shutter of a camera to be opened during a period starting at a time when the magnitude of the at least one parameter is below a predetermined value and is decreasing. The at least one parameter may comprise a value of velocity of the camera. More particularly, the at least one parameter may comprise the angular velocity of the camera. The at least one parameter may also comprise two values representing, respectively, the velocity of the camera in two different directions.

In accordance with yet another aspect of the present invention, an apparatus for preventing an image from being blurred in a camera is provided which includes at least one motion detecting means, and control means. The at least one motion detecting means detects at least one first parameter representative of the amount of movement applied to the camera and at least one second parameter representative of the amount of movement applied to the camera. The detecting means detects whether the magnitude of the at least one first parameter is below a predetermined value and detects whether the magnitude of the at least one second parameter is decreasing. The control means controls a shutter of the camera to be opened during a period starting at a time when the magnitude of the at least one first parameter is below a predetermined value, and the magnitude of the at least one second parameter is decreasing.

The at least one first parameter may comprise a value of velocity of the camera, and the at least one second parameter may comprise a value of acceleration of the camera. The at least one first parameter may comprise the angular velocity of the camera, and the at least one second parameter may comprise the angular acceleration of the camera. Further, in this regard, the at least one first parameter may comprise two values representing, respectively, the velocity of the camera in two different directions, and the at least one second parameter may comprise two values representing, respectively, the acceleration of the camera in two different directions.

According to one aspect of the present invention, there is provided an apparatus for preventing an image from being blurred in a camera, comprising at least one angular velocity detecting means for detecting the angular velocity applied to the camera, and an actuating means for actuating a shutter of the camera when the angular velocity detected by the angular velocity detecting means is below a predetermined value.

According to another aspect of the present invention, there is provided an apparatus for preventing an image from being blurred in a camera, comprising at least one angular velocity detecting means for detecting the angular acceleration applied to the camera, a detecting means for detecting that the angular acceleration detected by the angular velocity detecting means is decreasing, and an actuating means for actuating a shutter of the camera when the angular acceleration detected by the angular velocity detecting means is below a predetermined value and when it is decreasing.

Also, according to the present invention, there is provided an apparatus for preventing an image from being blurred in a camera, comprising at least one angular velocity detecting means for detecting the angular velocity applied to the camera, and a shutter closing means for sending a closing signal to a shutter of the camera to compulsively close the shutter when the angular velocity detected by the angular velocity detecting means is above a predetermined value and after the shutter has already begun operating.

According to still another aspect of the present invention, there is provided an apparatus for preventing an image from being blurred in a camera, comprising at least one angular velocity detecting means for detecting the angular velocity applied to the camera, and a shutter closing means for sending a closing signal to a shutter of the camera to compulsively close the shutter when an integrated value of the output of the angular velocity detecting means is above a predetermined value after the shutter begins opening.

Preferably, a detector is provided for detecting that the angular velocity is decreasing, so that the shutter can be released only when the angular velocity is decreasing, which means the camera shake is being damped.

Preferably, two angular sensors are provided to detect the components of the angular velocity in two orthogonal directions.

Alternatively, it is also possible to provide only one angular sensor which detects the angular velocity in the vertical direction to control the closing timing and/or the opening timing of the shutter, since the movement of the optical axis due to the camera-shake occurs mainly in the vertical direction.

In the present invention, although it is necessary to provide at least one sensor for detecting the angular velocity or angular acceleration, no drive for driving a conventional corrective lens is needed. In the present invention, the commencement of the opening operation and the compulsive closing of the shutter can be controlled in accordance with computer software, e.g., by a CPU (Central Processing Unit) which is usually incorporated in a compact camera, thus resulting in a realization of an inexpensive and small blur-preventing apparatus for a camera.

BRIEF DESCRIPTION OF THE DRAWINGS

The invention will be described below in detail with reference to the accompanying drawings, in which.

DESCRIPTION OF THE PREFERRED EMBODIMENTS

Figure 1:
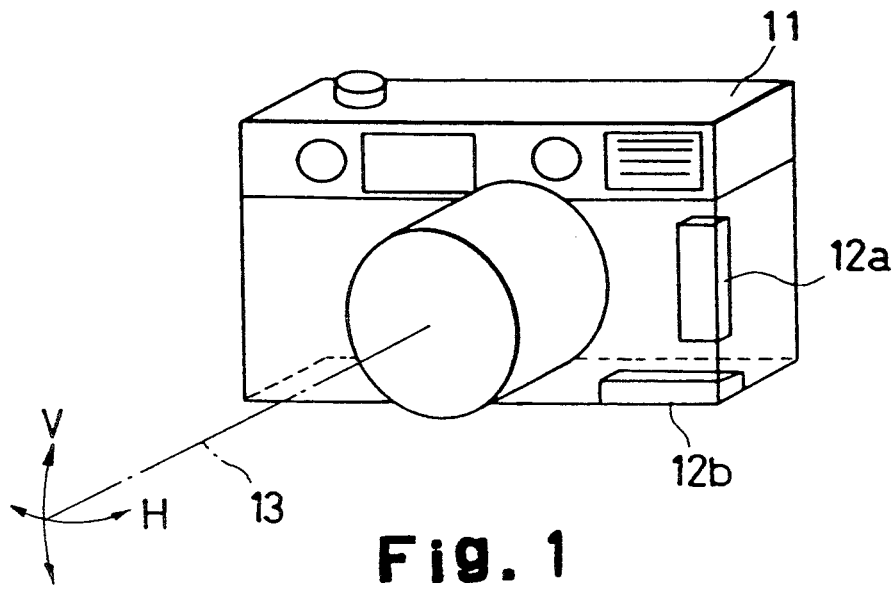
FIG. 1 is a perspective view of a camera having a blur-preventing apparatus according to the present invention.

FIG. 1 shows a camera 11 to which the present invention is applied. The camera 11 has two angular acceleration sensors 12a and 12b which detect acceleration in two orthogonal directions. The acceleration sensor 12a detects the acceleration of the component of the lens optical axis 13 in the horizontal direction H and the acceleration sensor 12b detects the acceleration of the component of the lens optical axis 13 in the vertical direction V. The acceleration sensors 12a and 12b are known per se and can be, for example, a sensor, as disclosed in Japanese Patent Application Serial No. 1-84318 which was filed in the name of the assignee of the present application, or an acceleration sensor "EYK-G02C" (trade name) available on the market by Matsushita Denshi Buhin K. K. The acceleration sensor "EYK-G02C", which utilizes the Coriolis force produced by an oscillating tuning fork, has a gyro-signal detecting portion having two bimorph-elements, which are generally arranged in a T-shape, a tuning fork driving circuit, and a signal processing circuit.

FIGS. 2A, 2B and FIGS. 3A, 3B show embodiments in which the shutter begins opening after the camera-shake is damped to allowable limits.

Figure 2A:
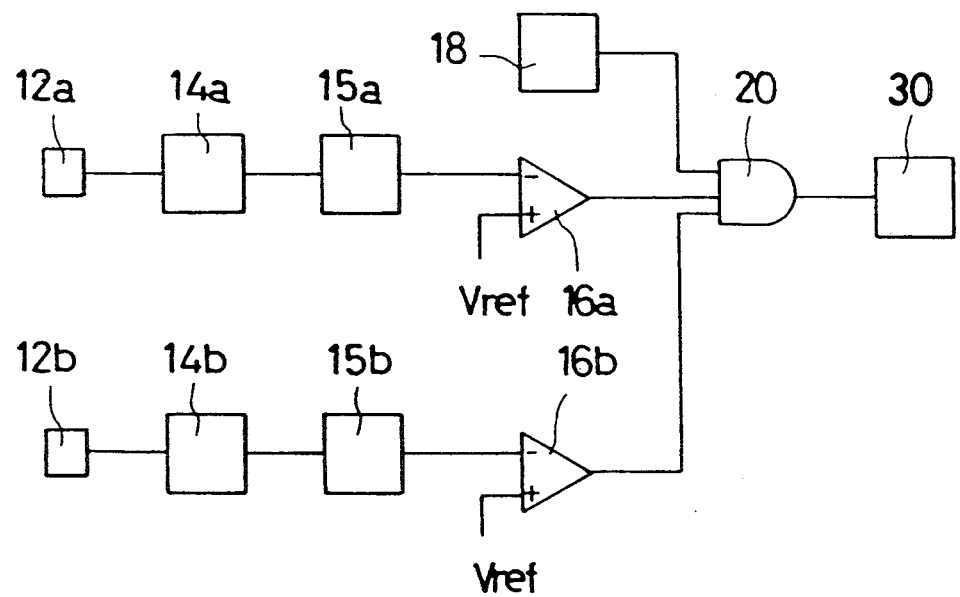
FIG. 2A is a block diagram of a circuit arrangement of a blur-preventing apparatus according to a first embodiment of the present invention.

In the circuit shown in FIG. 2A, the acceleration sensors 12a and 12b are connected to comparators 16a and 16b through integration circuits 14a and 14b which integrate the outputs of the acceleration sensors 12a and 12b to convert them into the angular velocities and absolute value circuits 15a and 15b, respectively. The comparators 16a and 16b compare the output levels of the absolute value circuits 15a and 15b with a reference voltage Vref, so that when the output levels of the absolute value circuits 15a and 15b are below the reference voltage Vref, the comparators 16a and 16b output a "High" level voltage.

The comparators 16a and 16b and a shutter operation detecting circuit 18 are connected to the logical product circuit 20 which is in turn connected to a shutter drive circuit 30. The shutter operation detecting circuit 18 is, for example, composed of an exposure arithmetic operating circuit, an AF drive circuit or the like, which outputs a "High" level voltage when the shutter operation can be effected. The logical product circuit 20 outputs the "High" level output when the outputs of the comparators 16a, 16b and the shutter operation detecting circuit 18 are all "High". When the output of the logical product circuit 20 is "High", the shutter drive circuit 30 operates, that is, the shutter begins opening.

Figure 2B:
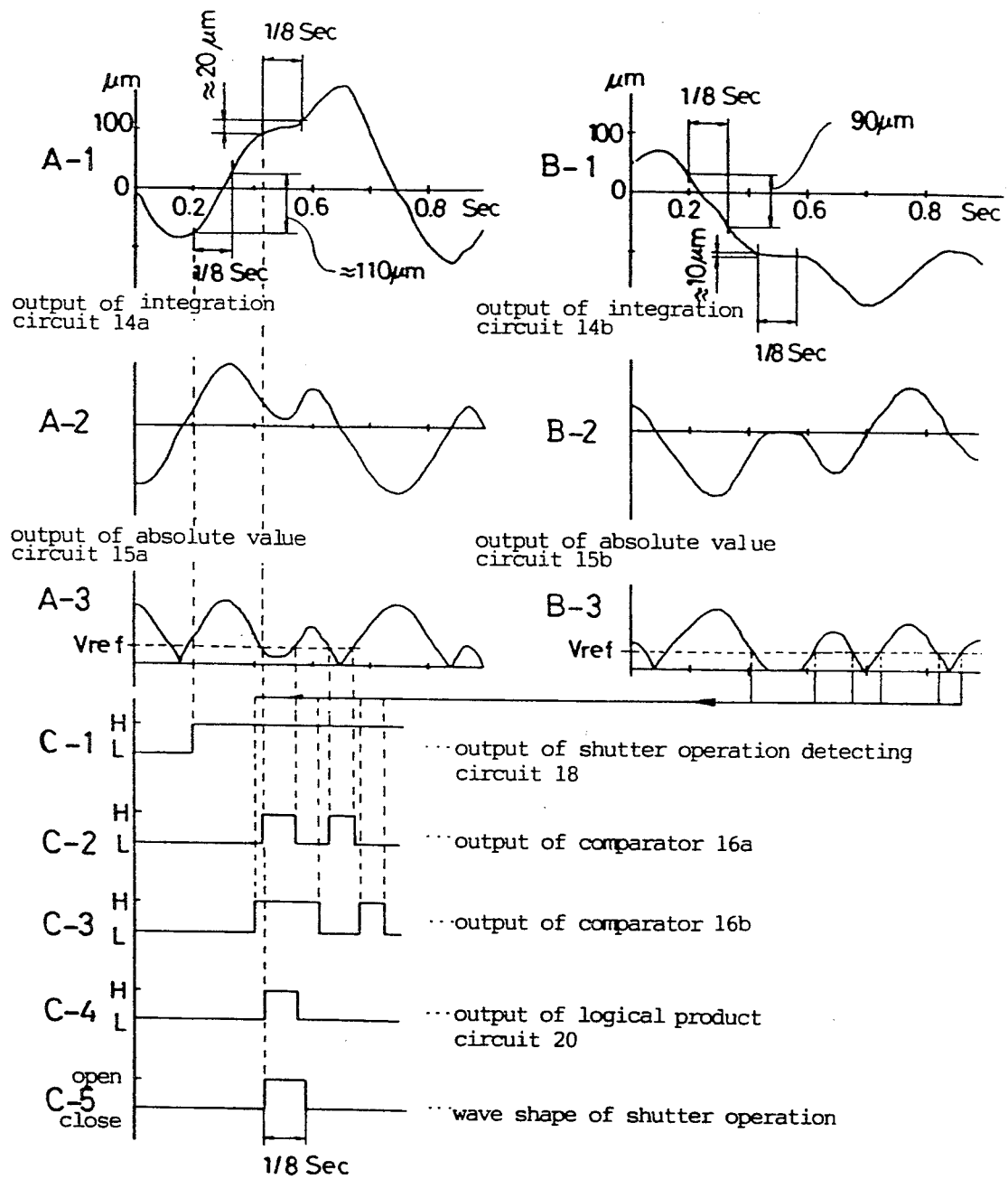
FIG. 2B shows diagrams of a wave shape of a blurred image and output wave shapes of elements shown in FIG. 2A in accordance with the wave shape of the blurred image.

The following discussion will be directed to the operations of the blur preventing apparatus of FIG. 2A discussed above, with reference to FIG. 2B by way of example. Generally speaking, the oscillation due to the camera-shake is considered to be a composite oscillation in which single oscillations having an upper limit frequency of about 10 Hz are irregularly compounded. In FIG. 2B, A-1 and B-1 show an example of a wave shape of the camera-shake oscillation. A-1 shows a displacement oscillation component in the horizontal direction H and B-1 shows a displacement oscillation component in the vertical direction V. The ordinate represents the amount ($\mu$m) of blur of an image on a film plane, and the abscissa represents the time (sec.), respectively. The time axes in A-1 have the same scale. The blur of an image on a film plane is proportional to the displacement of the camera due to shaking.

The wave shapes output by the acceleration sensors 12a and 12b are converted to wave shapes of an angular velocity shown in A-2 and B-2 through the integration circuits 14a and 14b, respectively. The wave shapes of A-2 and B-2 are converted to wave shapes shown in A-3 and B-3 through the absolute value circuits 5a and 15b, respectively. The wave shapes shown in A-2 and B-2 correspond to differentiated wave shapes of the wave shapes shown in A-1 and B-1, respectively.

The comparators 16a and 16b compare the output wave shapes of A-3 and B-3 with the reference voltage Vref. If the outputs are below Vref, the comparators output the "High" level outputs (as shown in C-2, C-3, respectively). This means that when the absolute values of the angular velocity in the horizontal and vertical directions H and V, are below a predetermined value, signals output by the comparators 16a and 16b are in a "High" state.

The shutter operation detecting circuit 18 outputs a signal level of "High" when the shutter can be actuated upon the completion of for example, the AF drive circuit. As a result, the AND circuit 20 sends a drive signal to the shutter drive circuit 30 when all of the outputs of the shutter operation detecting circuit 18 and the comparators 16a and 16b are "High", thus actuating the shutter.

Suppose, for example, that the shutter speed is $\frac{1}{8}$ sec., and the absolute values of the blur are as shown in FIG. 2B, A-1 and B-1, the amounts of the blur in the horizontal direction H and the vertical direction V occuring during the $\frac{1}{8}$ sec. period being about 20 $\mu$m and 10 $\mu$m, respectively. The amount of the actual blur on the film plane would be $(20^2+10^2)^{\frac{1}{2}}=22$ $\mu$m.

If the present invention were not utilized, that is, if the shutter were actuated as soon as the output of the shutter operation detecting circuit 18 becomes "High" (e.g. at 0.2 sec. of the abscissas in A-1 and B-1 of FIG. 2B), it can be seen in A-1 and B-1 that the amounts of blur in the horizontal direction H and the vertical direction V are 110 $\mu$m and 90 $\mu$m, respectively. Thus the amount of blur on the film plane is $(110^2+90^2)^{\frac{1}{2}}=142$ $\mu$m. Therefore, according to the present invention, the amount of blur is one sixth that in the prior art.

It should be appreciated that the above discussion can be generally applied.

The blur on the film plane can be effectively reduced or eliminated by deferring the actuation of the shutter until the angular accelerations (or angular velocities) in the two orthogonal directions becomes below a predetermined value within allowable limits.

In view of the tendency of camera-shake to occur in a vertical direction rather than in a horizontal direction, it is possible to detect the blur only in the vertical direction, so that the shutter is actuated after the value of the velocity or acceleration in the vertical direction falls below a predetermined value.

In the above discussion, in A-1 and B-1 of FIG. 2B, the time at which the shutter is actuated to open correspond to the substantially level portion of both wave shapes A-1 and B-1. However, in practice, there is a possibility that the shutter would begin opening at a time corresponding to 0 a plateau of the wave shape in the vertical direction V and a peak value of the wave shape in the horizontal direction H or a time corresponding to a peak value of the wave shape in the vertical direction V and a peak value of the wave shape in the horizontal direction H. In the present invention, in both of the above-described instances, the shutter release may be delayed until the angular acceleration falls below a predetermined value, to eliminate the blur. The delay of the shutter release is very short and practically negligible.

Figure 3A:
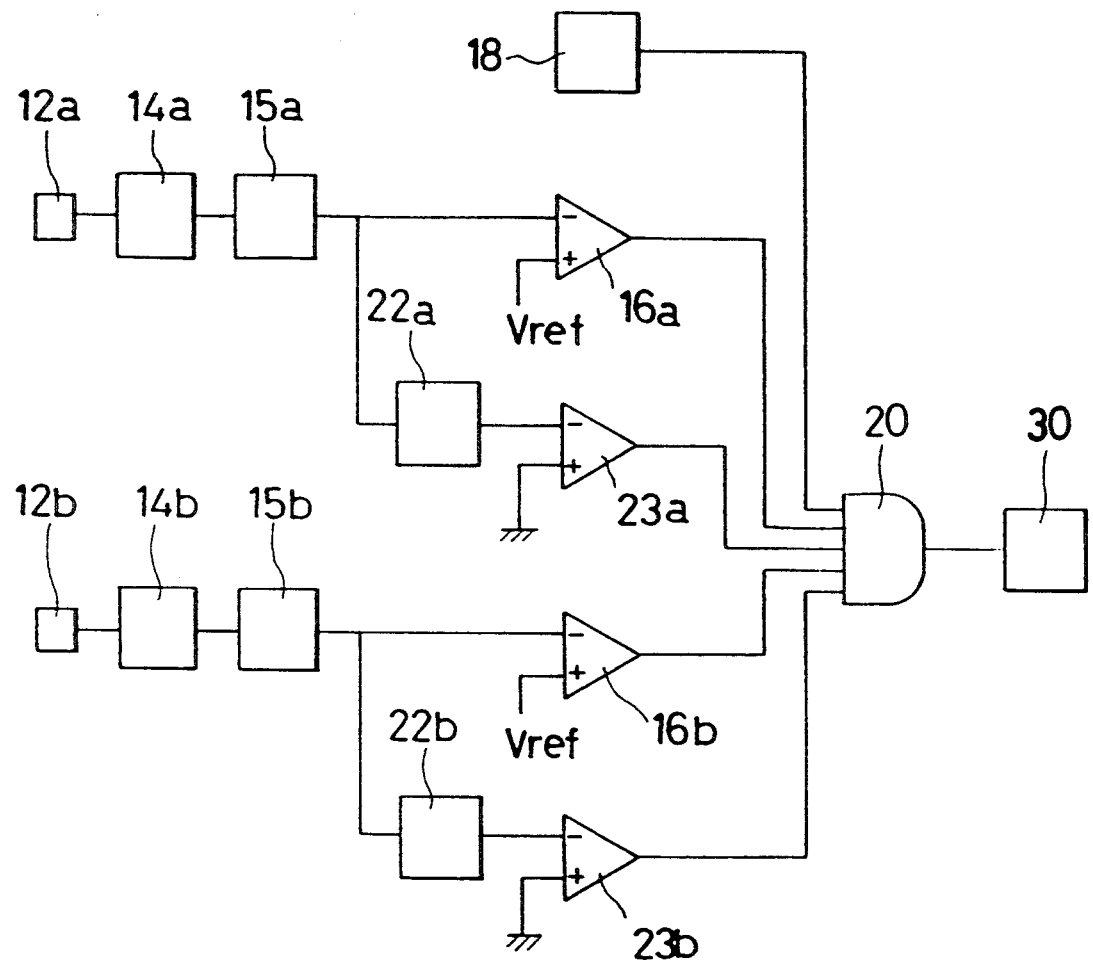
FIGS. 3A and 3B are views corresponding to FIGS. 2A and 2B, respectively, depicting a second embodiment of the present invention.
Figure 3B:
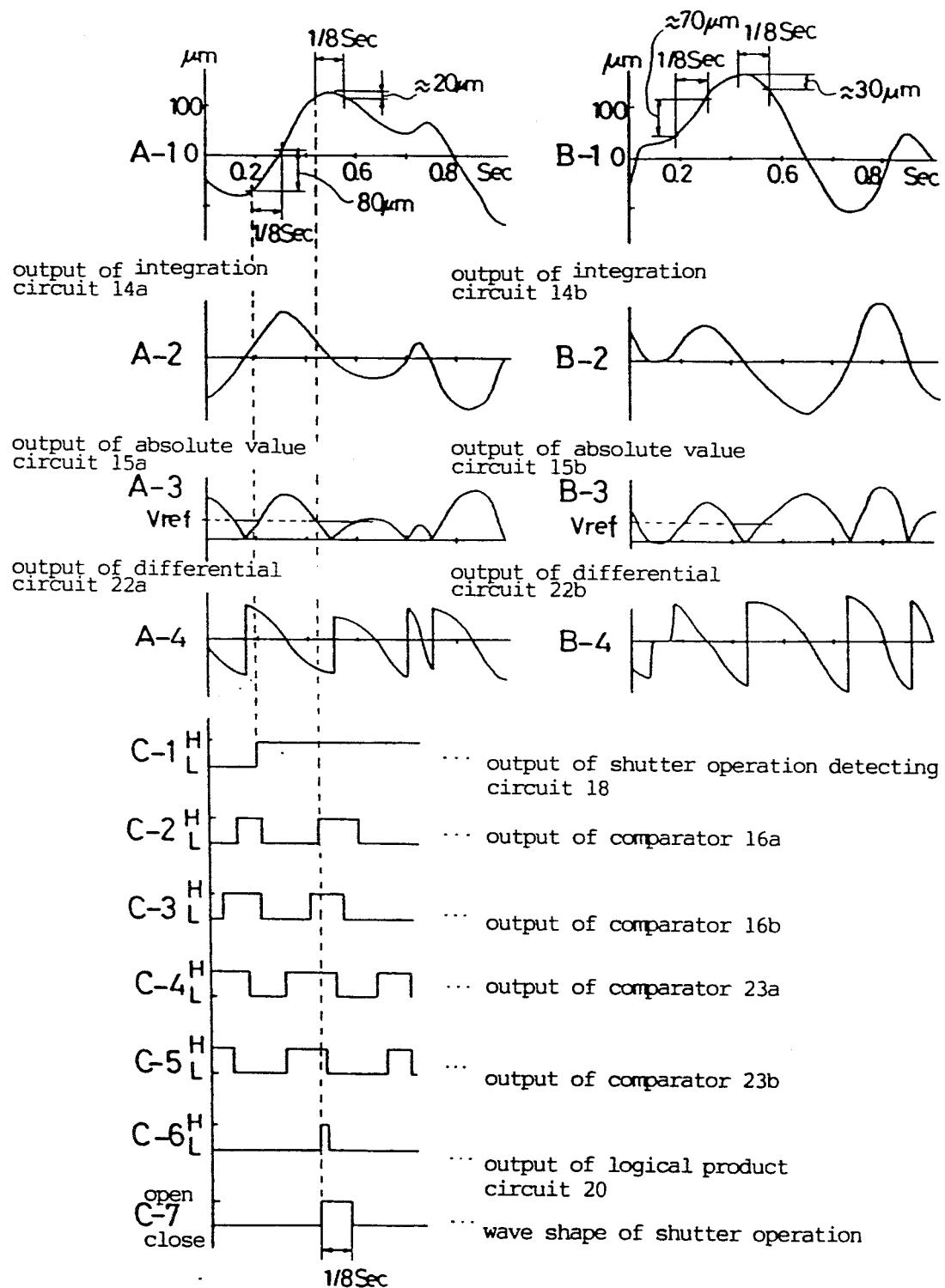

FIGS. 3A and 3B show a second embodiment of the present invention where the shutter release is delayed until the angular acceleration falls below zero. In the second embodiment, the output of the comparators 16a and 16b become "High" at times corresponding to the vicinity of the end of the plateau of the wave shape in A-1 and a point beyond the peak value, respectively, which however hardly happens from a statistical viewpoint. The blur can be eliminated or suppressed even in such a very rare case. However, in the second embodiment, since the angular velocity is increasing (namely, the wave shape of the oscillation of the camera-shake is transformed to describe an ascending curve), and since the shutter begins opening thereafter, the blur elimination effect may not be as effective as in the first embodiment.

In FIGS. 3A and 3B, the components corresponding to those in FIGS. 2A and 2B are designated with the same reference numerals as those in FIGS. 2A and 2B. The differences of the second embodiment (FIG. 3A) from the first embodiment (FIG. 2A) reside in that the outputs of the absolute value circuits 15a and 15b are connected to differential circuits 22a and 22b, the output of the differential circuits 22a and 22b, are input to comparators 23a and 23b, and that the output of the comparators 23a and 23b are input to the logical product circuit 20, together with the outputs of the comparators 16a and 16b and the output of the shutter operation detecting circuit 18, respectively. The comparators 23a and 23b output a "High" level voltage when the output of the differential circuits 22a and 22b are negative values. The negative values of the output of the differential circuits 22a and 22b signify that the associated absolute value of the angular velocities are decreasing.

With the arrangement shown in FIG. 3A, when the output of both the comparators 23a and 23b becomes "High," in addition to the output signals of the shutter operation detecting circuit 18 and the comparators 16a and 16b, the logical product circuit 18 sends the operation (drive) signals to the shutter drive circuit 30. When the output absolute value of the angular velocities are decreasing, as mentioned before, and accordingly, no shutter is actuated during an increase of the camera-shake.

In FIG. 3B, the shutter speed is ⅛ sec. and the opening of the shutter commences at about 0.43 sec. of the abscissa. The amounts of the blur in the horizontal direction H and the vertical direction V are about 20 μm and 30 μm, respectively. Accordingly, the amount of the actual blur on the film plane is $(20^2+30^2)^{\frac{1}{2}}=36$ μm.

If the present invention was not utilized, that is, if the shutter was actuated as soon as the output of the shutter operation detecting circuit 18 becomes "High" (e.g. at 0.18 sec. of the abscissa in A-1 and B-1 of FIG. 3B at which the angular velocity of the blur ascends), it can be seen in A-1 and B-1 that the amounts of blur in the horizontal direction H and the vertical direction V are 80 μm and 70 μm, respectively, so that the amount of blur on the film plane is $(80^2+70^2)^{\frac{1}{2}}=106$ μm. Therefore, according to the present invention, the amount of blur is one third that in the prior art.

In the second embodiment, the period in which the absolute value of the angular velocity of the blur is descending is detected, so that the shutter is actuated only when the period is detected. Thus, the blur of image can be effectively damped. Although the time at which the shutter is released is delayed by about 0.25 sec., invention the delay is practically negligible.

The following discussion will be directed to the third through sixth embodiments of the present invention, shown in FIGS. 3A and 4B through 7A and 7B, respectively.

In these embodiments, not only the opening timing of the shutter, but also the closing timing thereof are controlled. Namely, when the camera-shake is above a predetermined limit during opening of the shutter, the shutter is compulsively closed even though a predetermined exposure may not be finished.

Figure 4A:
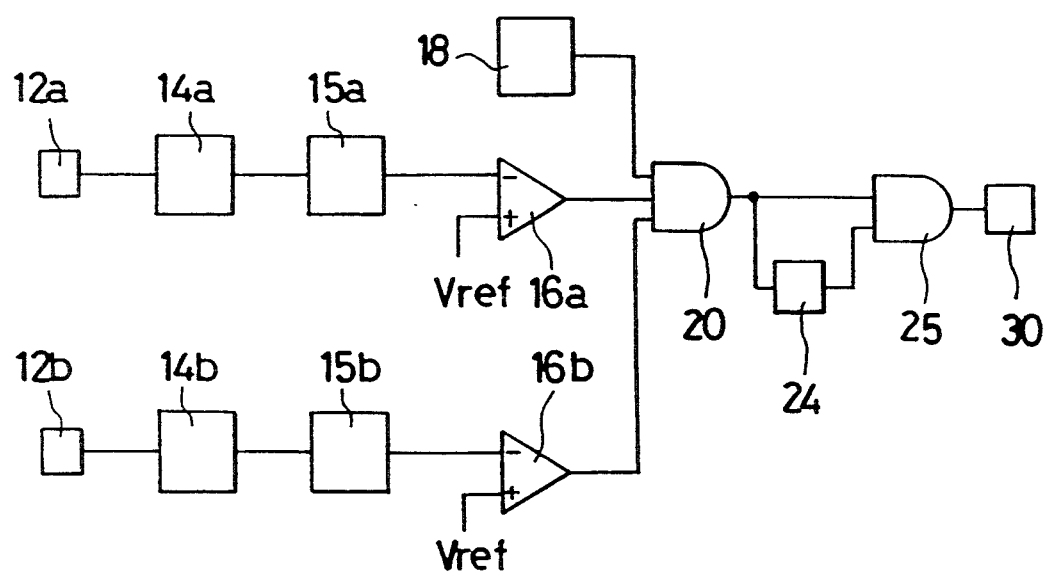
FIGS. 4A and 4B are views corresponding to FIGS. 2A and 2B, respectively, depicting a third embodiment of the present invention.
Figure 4B:
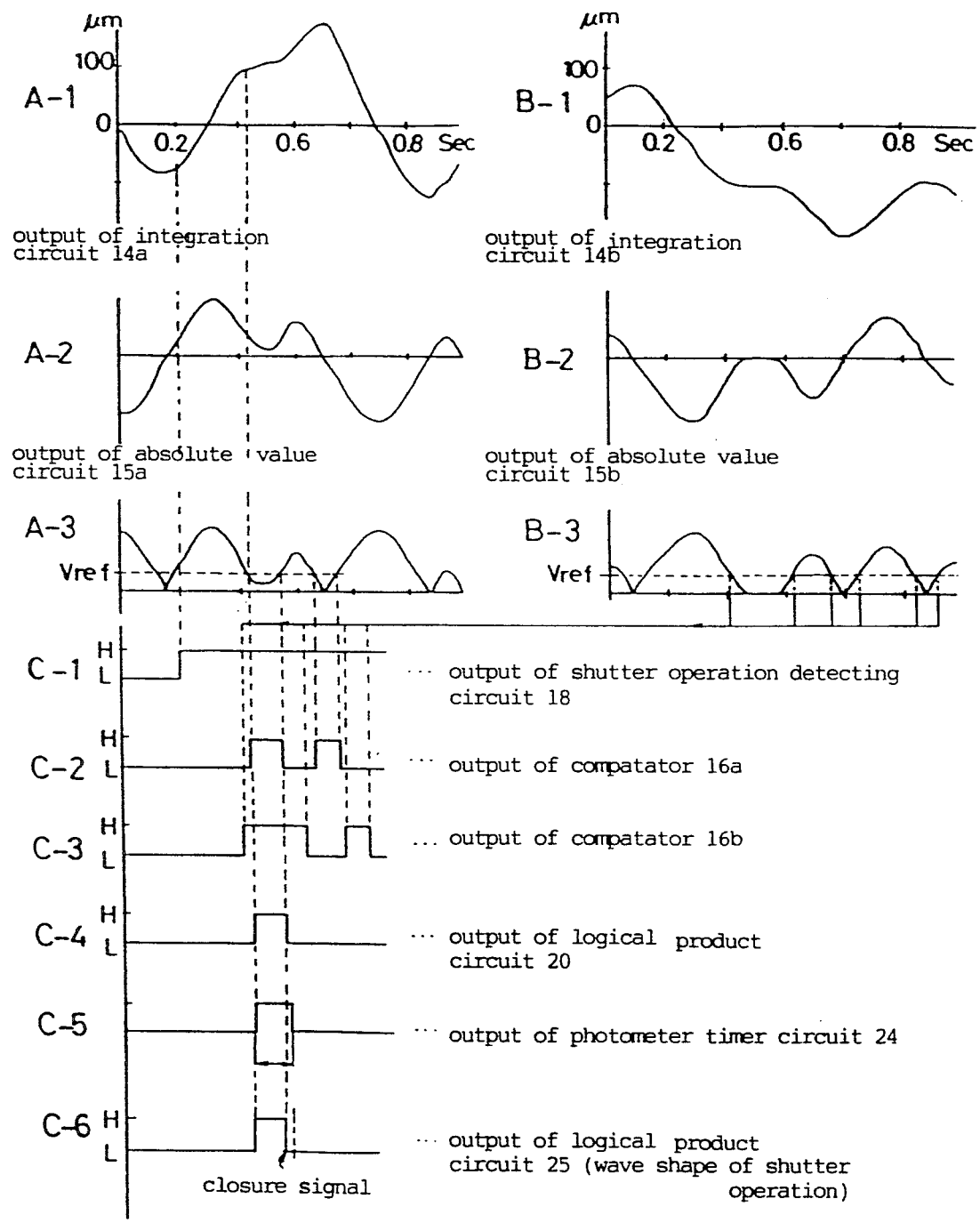

FIGS. 4A and 4B show a third embodiment of the present invention. In FIGS. 4A and 4B, the components corresponding to those in FIGS. 2A and 2B are designated with the same reference numerals as those in FIGS. 2A and 2B. In the third embodiment, the output of the comparators 16a and 16b are connected, together with the shutter operation detecting circuit 18 to the logical product circuit 20 which is in turn connected to the photometer (luminance detection) timer circuit 24. The output of the photometer timer circuit 24 and the logical product circuit 20 are connected to the logical product AND circuit 25 which is in turn connected to the shutter drive circuit 30. The logical product circuit 20 issues a signal of "High" level when the output of the comparators 16a and 16b and the shutter operation detecting circuit 18 become "High." When the output of the logical product circuit 20 becomes "High," the photometer timer circuit 24 operates. The photometer timer circuit 24 generates pulses for a predetermined space of time in accordance with the detection signal of the photometer circuit (not shown). The logical product circuit 25 actuates the shutter drive circuit 30 only when the output of the logical product circuit 20 and the photometer timer circuit 24 are both "High." Namely, the shutter drive circuit 30 opens the shutter for a predetermined exposure time determined by the Photometer timer circuit 24 when the camera-shake is within a predetermined limit. However, after the shutter opens, if the camera-shake exceeds a predetermined limit (i.e., when the output of the logical product circuit 20 becomes "Low") before the above-mentioned exposure time lapses, the shutter is compulsively closed. Namely, in this embodiment, the underexposure is accepted to prevent the blur of image.

With reference to FIG. 4B, the apparatus of the third embodiment operates as follows:

The operation shown in FIG. 4B corresponds to that shown in FIG. 2B.

As mentioned before, generally speaking, the oscillation due to camera-shake is considered to be a composite oscillation in which single oscillations having an upper limit frequency of about 10 Hz are irregularly compounded. In FIG. 4B, A-1 and B-1 show an example of a wave shape of the camera-shake oscillation. A-1 shows an oscillation component in the horizontal direction H and B-1 shows an oscillation component in the vertical direction V. The ordinate represents the amount (μm) of blur of image on a film plane and the abscissa represents the time (seconds), respectively. The time axes in A-1 and B-1 have the same scale.

Wave shapes output by the acceleration sensors 12a and 12b respectively are converted to wave shapes of an angular velocity as shown in A-2 and B-2 through the integration circuits 14a and 14b. The wave shapes of A-2 and B-2 are converted to wave shapes shown in A-3 and B-3 through the absolute value circuits 15a and 15b, respectively. The wave shapes shown in A-2 and B-2 correspond to differentiated wave shapes of the wave shapes shown in A-1 and B-1, respectively.

The comparators 16a and 16b compare the output wave shapes of A-3 and B-3 with the reference voltage Vref. If the output is below Vref, the comparators output the "High" level output (as shown by C-2, C-3 in FIG. 4B). This means that when the absolute values of the angular velocity in the horizontal and vertical directions H and V, obtained from the angular accelerations detected by the angular acceleration sensors 12a and 12b, are below a predetermined value, that is, when the absolute values of the blur are below a predetermined value, the comparators 16a and 16b output signals of level "High."

The shutter operation detecting circuit 18 outputs a signal of level "High" when the shutter can be actuated upon the completion of, for example, an AF drive circuit. As a result, the logical product circuit 20 sends a drive signal to the photometer timer circuit 24 when all of the output of the shutter operation detecting circuit 18 and the comparators 16a and 16b are "High." The timer circuit 24 generates pulses for a predetermined time corresponding to the luminance of an object to be taken (C-4, C-5). The logical product ("AND") circuit 25 commences the operation of the shutter drive circuit 30 when the output of the logical product circuit 20 is "HIGH" and stops the operation of the shutter drive circuit 30 when the output of the logical product circuit 20 is "LOW". The amount of time the shutter's drive circuit is operated is equal to the optimum exposure time so long as the camera-shake is within a predetermined limit.

However, if the pulse of the logical product circuit 20 lowers before the pulse of the photometer timer circuit 24 lowers (namely, if the camera-shake exceeds a predetermined limit), the closure signal is sent to the shutter drive circuit 30 to close the shutter (C-6). Namely, the shutter is closed in the state of underexposure to prevent the blur of image.

Figure 5A:
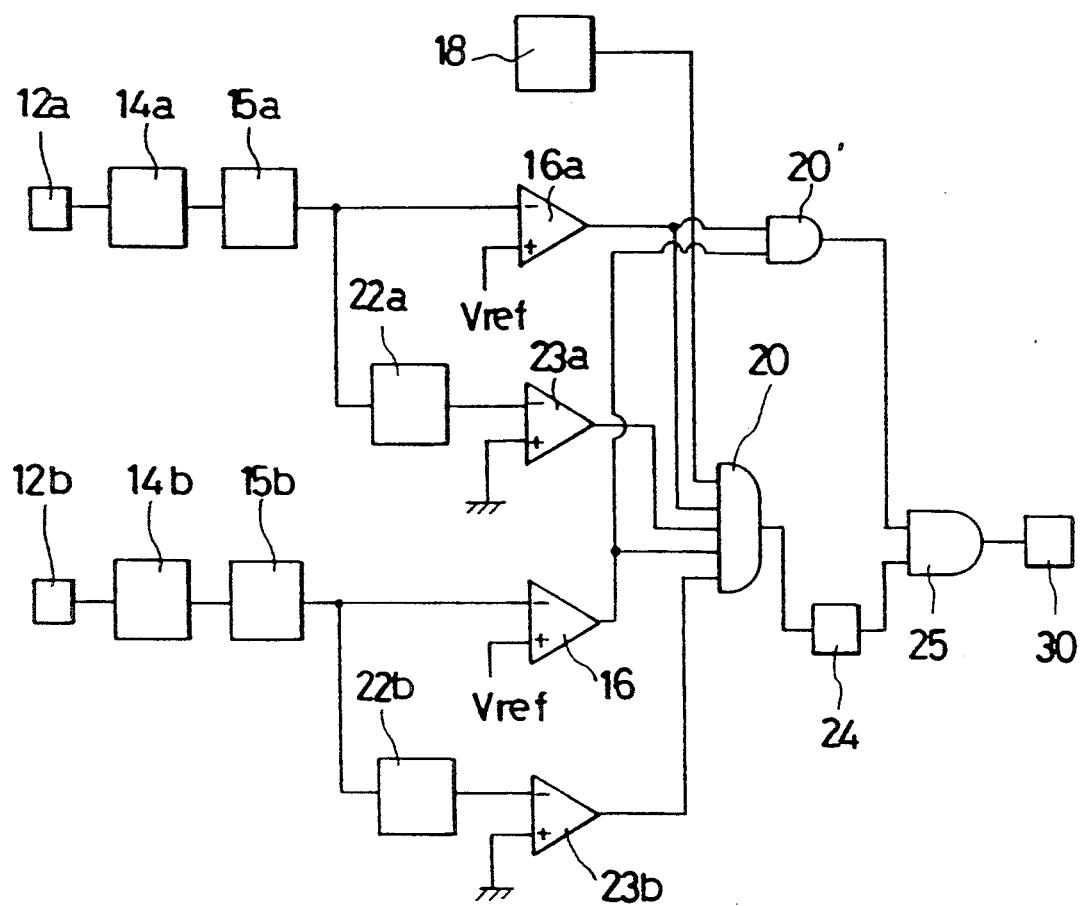
FIGS. 5A and 5B are views corresponding to FIGS. 2A and 2B, respectively, depicting a fourth embodiment of the present invention.
Figure 5B:
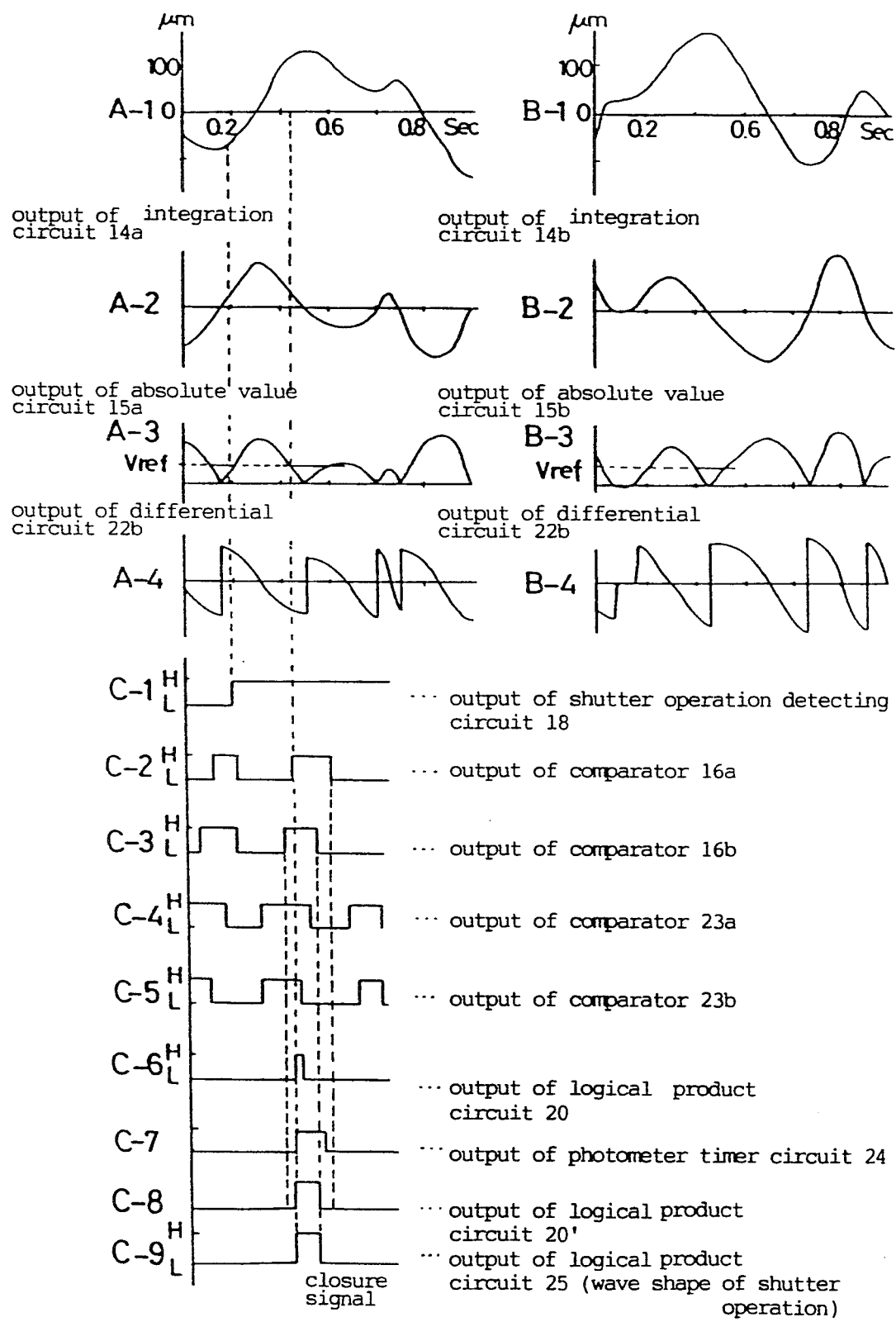

FIGS. 5A and 5B show a fourth embodiment of the present invention, which is a modification of the second embodiment shown in FIGS. 3A and 3B. In the fourth embodiment, the decrease of the camera movement is detected to control the opening and closing of the shutter. In the fourth embodiment, the components corresponding to those in FIGS. 3A and 3B are designated with the same reference numerals as those in FIGS. 3A and 3B. The differences of the fourth embodiment (FIG. 5A) from the third embodiment (FIG. 4A) reside in that the outputs of the absolute value circuits 15a and 15b are connected to the differential circuits 22a and 22b, the outputs of the differential circuits 22a and 22b are input to comparators 23a and 23b, the outputs of the comparators 23a and 23b are input to the logical product circuit 20, together with the outputs of the comparators 16a and 16b and the output of the shutter operation detecting circuit 18, the outputs of the comparators 16a and 16b are connected to another logical product circuit 20', and the output of the logical product circuit 20' and the photometer timer circuit 24 are connected to the logical product circuit 25.

The comparators 23a and 23b output a "High" level voltage when the outputs of the differential circuits 22a and 22b are negative values. The negative values of the output of the differential circuits 22a and 22b mean that the associated absolute values of the angular velocities are decreasing.

With this arrangement, when both outputs of the comparators 23a and 23b become "High", in addition to the output signals of the shutter operation detecting circuit 18 and the comparators 16a and 16b, the logical product circuit 20 sends the operation (drive) signals to the photometer timer circuit 24 (C-1 through C-7).

Since the comparators 16a and 16b are also connected to the second logical product circuit 20', the output of the logical product circuit 20' becomes "High" only when the camera-shake is within a predetermined limit. As a result, the shutter drive circuit 30 commences the operation when the camera-shake is decreasing within a predetermined limit and stops operating when the pulse of the photometer timer circuit 24 lowers (that is, at a time corresponding to optimum exposure), so long as the camera-shake is within a predetermined limit.

However, if the pulse of the logical product circuit 20' lowers before the pulse of the photometer timer circuit 24 lowers (namely, if the camera-shake exceeds a predetermined limit), the closure signal is sent to the shutter drive circuit 30 to close the shutter in a state of underexposure (see waveforms C-8 and C-9 in FIG. 5B).

In the third and fourth embodiments mentioned above, the time at which the closure signal is sent to the shutter is detected in accordance with the comparison of the angular velocity of the optical axis as an allowable limit of the camera-shake with a reference value by the comparators 16a and 16b. The closure signal of the shutter can be supplied within a predetermined limit of camera-shake by a simple arrangement such as that shown in FIG. 5A. However, strictly speaking, the blur of image on the film plane is proportional not to the speed of the camera-shake but to the integrated value of the speed of the camera-shake.

Figure 6A:
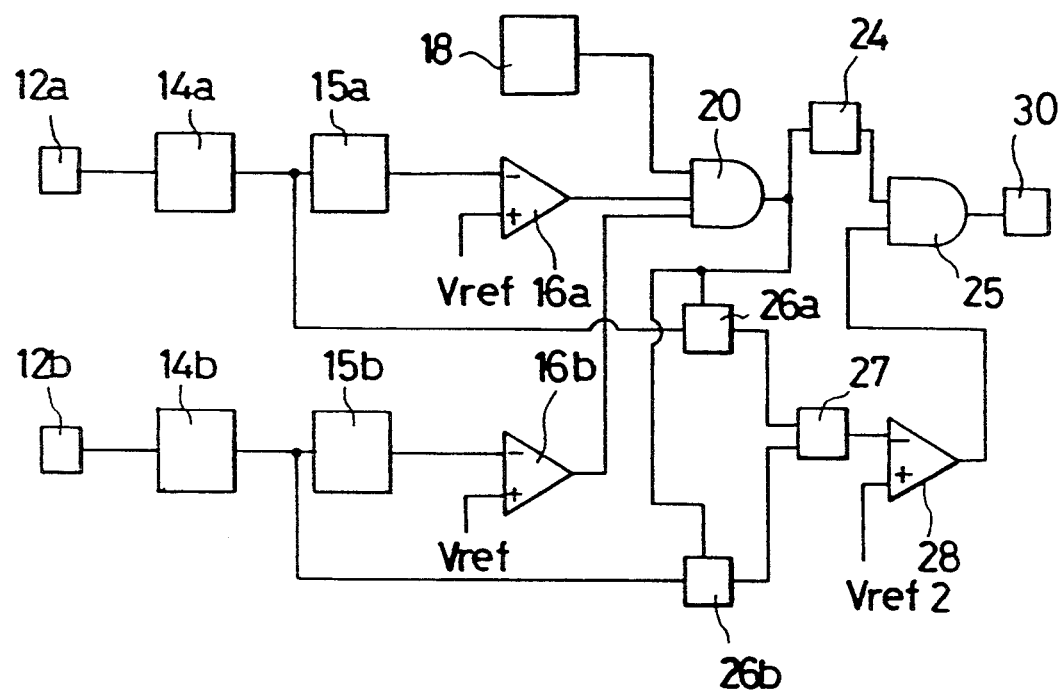
FIGS. 6A and 6B are views corresponding to FIGS. 2A and 2B, respectively, depicting a fifth embodiment of the present invention.
Figure 7A:
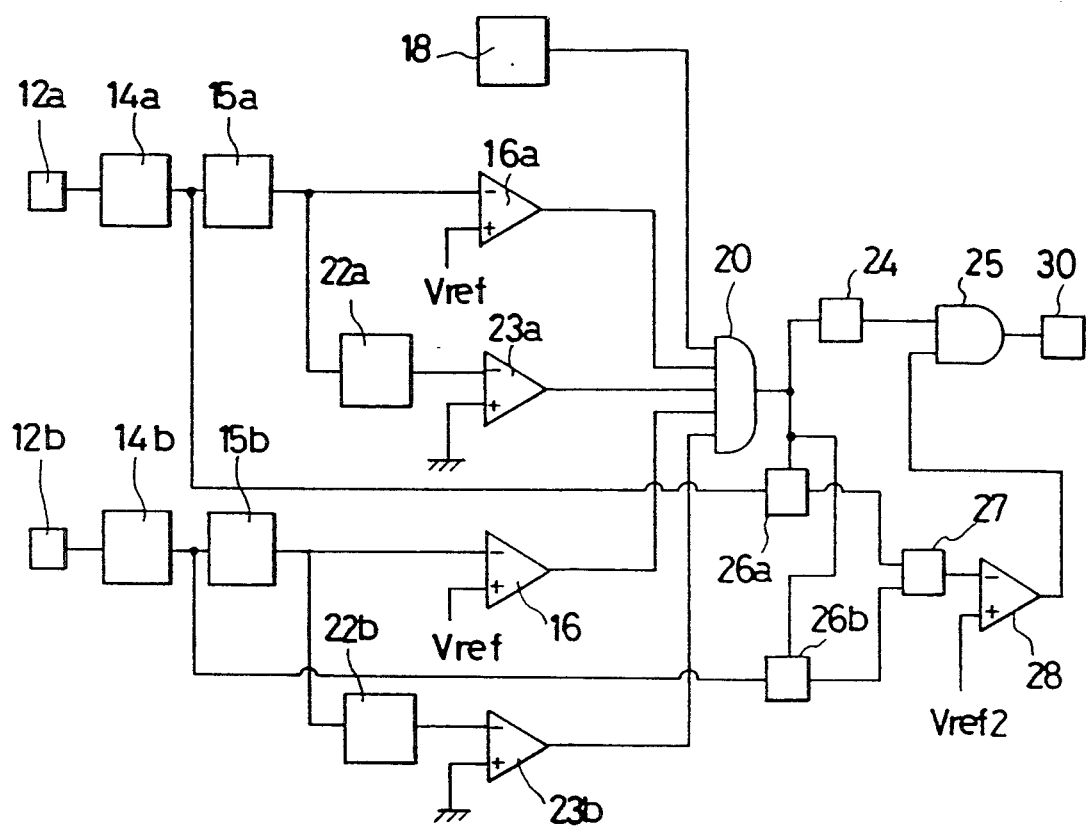
FIGS. 7A and 7B are views corresponding to FIGS. 2A and 2B, respectively, depicting a sixth embodiment of the present invention.

The embodiments shown in FIGS. 6A and 7A are directed to improvements in which the shutter closing signal more precisely corresponds to the displacement of the camera-shake.

In FIG. 6A, which corresponds to FIG. 4A, the logical product circuit 20 drives the photometer timer circuit 24 and the integration circuits 26a and 26b, which integrate the angular velocity of the camera's optical axis as outputted by the integration circuits 14a and 14b. Furthermore, the logical product circuit 20 drives the shutter drive circuit 30 through the logical product circuit 25. The output of the integration circuits 26a and 26b are converted to values which are in proportion to the blur of an image on the real film plane by an integration value resultant circuit 27 to be compared with the reference value (set value vREF2) by the comparator 28. Since the output of the comparator 28 is input, together with the output of the photometer timer circuit 24, to the logical product circuit 25, when the output of the integration value resultant circuit 27 exceeds a predetermined value, that is, when the blur of image exceeds an allowable limit after the shutter begins opening under the condition that the outputs of the photometer timer circuit 28 and the comparator 28 are "High," the closure signal is sent to the shutter even before the expiration of the exposure time determined by the photometer timer circuit 24, thus preventing the blur of an image at the expense of exposure.

Figure 6B:
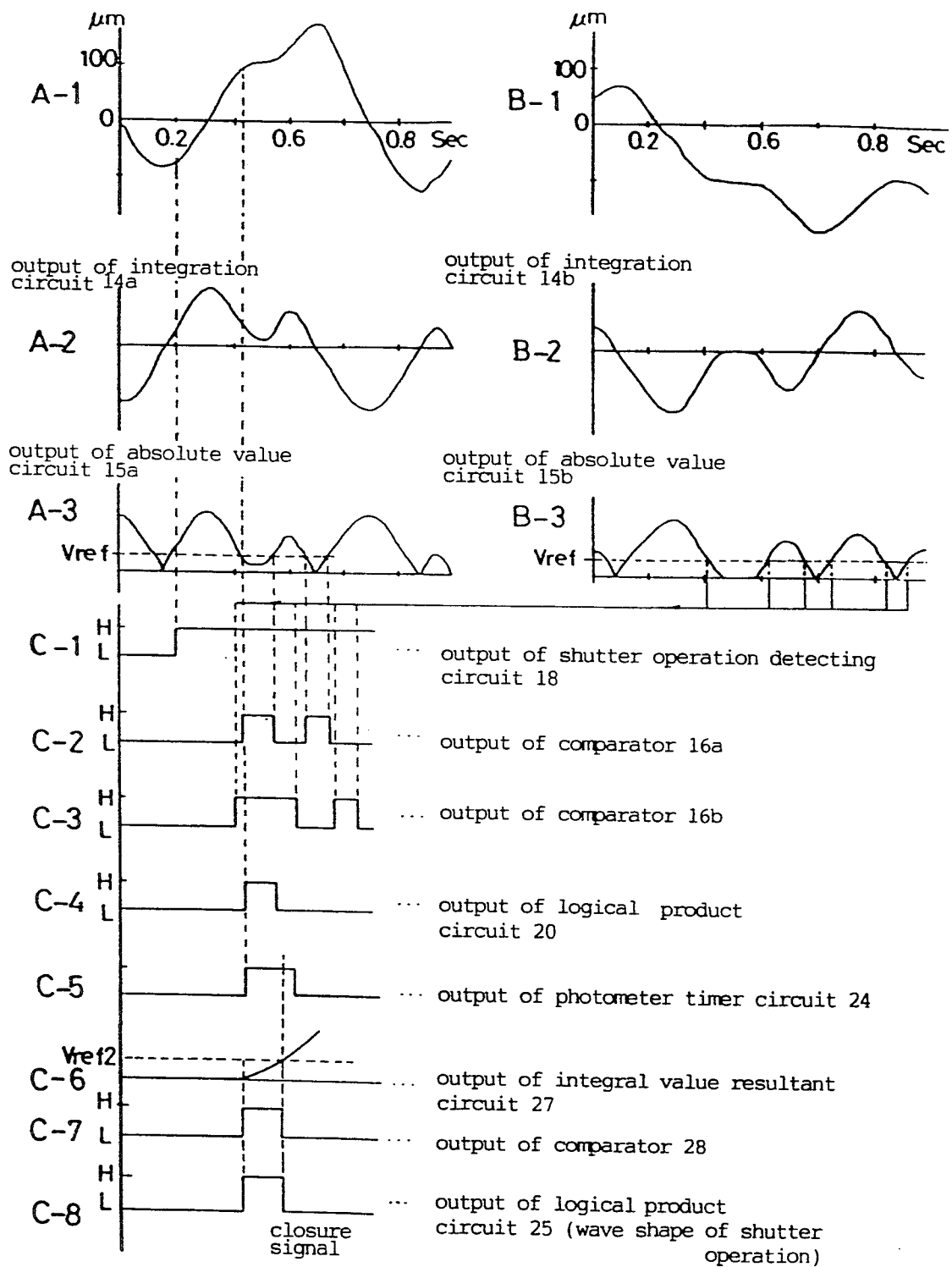

In FIG. 6B, the wave shapes shown in A-1 through C-5 are the same as those in FIG. 4B. C-6, C-7 and C-8 show the outputs of the integration value resultant circuit 27, the comparator 28 and the logical product circuit 25, respectively. As can be seen from FIG. 6B, when the output of the integration value resultant circuit 27 exceeds a predetermined value, the shutter closing signal is issued even before the completion of exposure.

In FIG. 7A which corresponds to FIG. 5A, the logical product circuit 20 drives the photometer timer circuit 24 and the integration circuits 26a and 26b which integrate the angular velocity of the optical axis as outputted by the integration circuits 14a and 14b. Furthermore, the logical product circuit 20 drives the shutter drive circuit 30 through the logical product circuit 25. The output of the integration circuits 26a and 26b are converted to values which are in proportion to the blur of an image on the real film plane by an integration value resultant circuit 27 to be compared with the reference value (set value) by the comparator 28. Since the output of the comparator 28 is input, together with the output of the photometer timer circuit 24, to the logical product circuit 25, when the output of the integration value resultant circuit 27 exceeds a predetermined value, that is, when the blur of image exceeds an allowable limit after the shutter begins opening under the condition that the output of the photometer timer circuit 28 and the comparator 28 are "High", the closure signal is sent to the shutter even before the expiration of the exposure time determined by the photometer timer circuit 24, thus preventing the blur of the image at the expense of exposure.

Figure 7B:
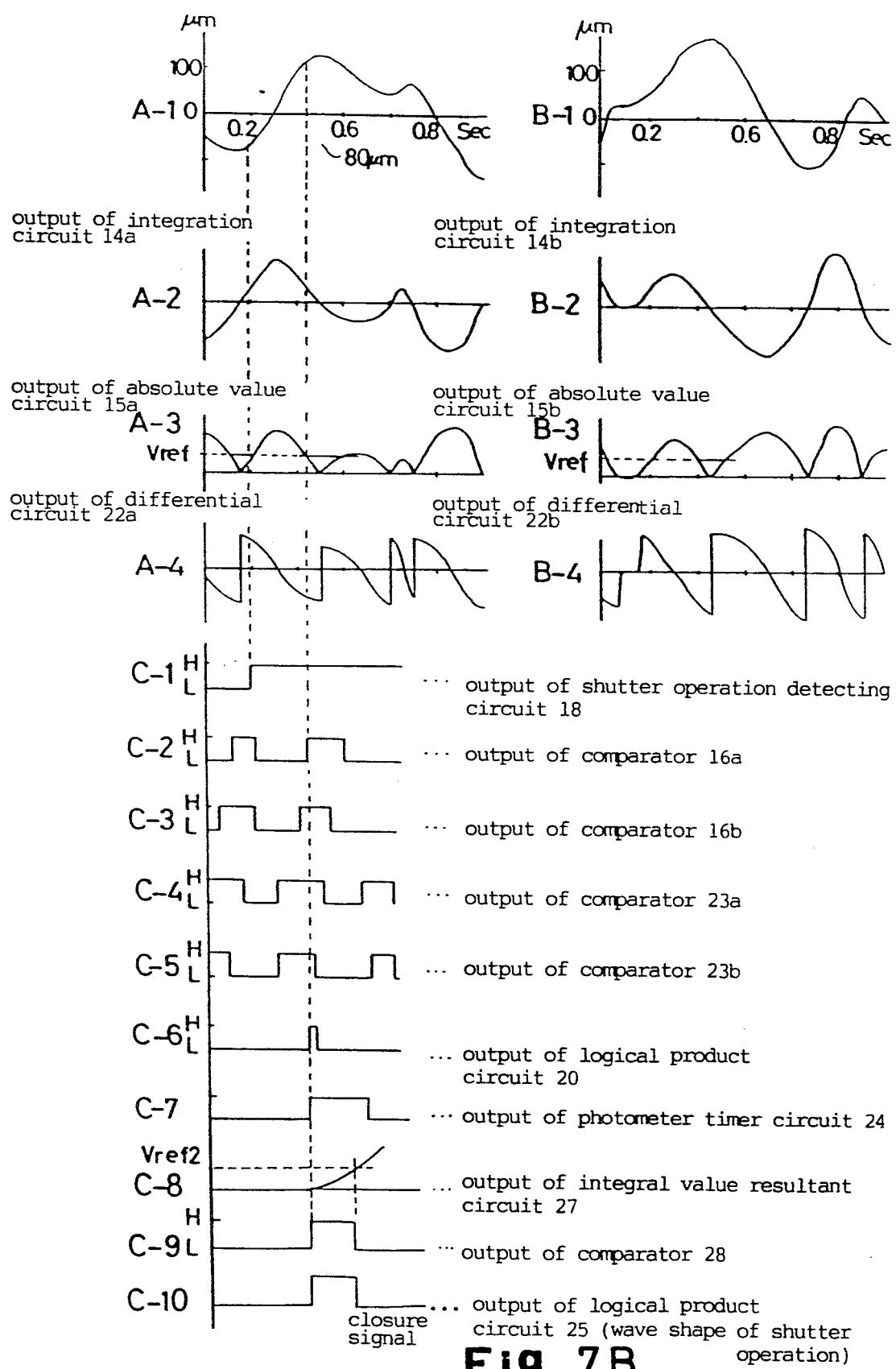

In FIG. 7B, the wave shapes shown in A-1 through C-7 are same as those in FIG. 5B. C-8, C-9 and C-10 show outputs of the integration value resultant circuit 27, the comparator 28 and the logical product circuit 25, respectively. As can be seen from FIG. 7B, when the output of the integration value resultant circuit 27 exceeds a predetermined value, the shutter closing signal is issued even before the completion of exposure.

In the above-mentioned embodiments, the angular acceleration sensors 12a and 12b are used to detect the angular velocity. Alternatively, it is possible to replace the angular acceleration sensors 12a and 12b and the integration circuits 14a and 14b with angular velocity sensors to directly detect the angular velocity. In this alternative, the wave shapes shown in A-2 and B-2 of FIGS. 2B, 3B, 4B, 5B, 6B and 7B can be obtained as output of the angular velocity sensors.

Although the two sensors 12a and 12b are used to detect the angular velocities in the horizontal direction and the vertical direction, in the above-mentioned embodiments, it is possible to provide only one sensor which detects the angular velocity in the vertical direction, since the movement of the optical axis due to the camera-shake takes place mainly in the vertical direction. In the case of two sensors being provided, the directions of detection thereby are not limited to vertical and horizontal directions, and may be any two orthogonal directions.

I claim:

1. An apparatus for preventing an image from being blurred in a camera, comprising:
   at least one angular velocity detecting means for detecting the absolute value of the angular velocity applied to the camera;
   detecting means for detecting that the absolute value of the angular velocity detected by said angular velocity detecting means is below a predetermined value; and
   actuating means for actuating a shutter of the camera only when the absolute value of the angular velocity detected by said angular velocity detecting means is below a predetermined value and the absolute value of the angular velocity is decreasing.

2. A blur-preventing apparatus according to claim 1, wherein said angular velocity detecting means comprises a pair of sensors which detect the components of the angular acceleration in two orthogonal directions.

3. A blur-preventing apparatus according to claim 2, wherein said two orthogonal directions are horizontal and vertical directions.

4. A blur-preventing apparatus according to claim 2, wherein said angular velocity detecting means comprises a single sensor which detects the angular acceleration in the vertical direction.

5. A blur-preventing apparatus according to claim 1, wherein said angular velocity detecting means comprises at least one angular acceleration detecting sensor which detects the angular acceleration and at least one integration circuit which integrate said output of the angular acceleration detecting sensor.

6. An apparatus for preventing an image from being blurred in a camera, comprising:
   at least one angular velocity detecting means for detecting the angular velocity applied to the camera; and,
   shutter closing means for sending a closed signal to a shutter of the camera to compulsively close the shutter when the absolute value of the angular velocity detected by said angular velocity detecting means is above a predetermined value after the shutter begins operating.

7. A blur-preventing apparatus according to claim 6, further comprising control means for controlling the opening operation of the shutter when the absolute value of the angular velocity detected by said angular velocity detecting means is below a predetermined value.

8. A blur-preventing apparatus according to claim 7, further comprising detecting means for detecting that the absolute value of the angular velocity detected by said angular velocity detecting means is decreasing, so that the control means opens the shutter when the absolute value of the angular velocity detected by said angular velocity detecting means is decreasing.

9. A blur-preventing apparatus according to claim 8, wherein said angular velocity detecting means comprises a pair of sensors which detect the components of the angular velocity in two orthogonal directions.

10. A blur-preventing apparatus according to claim 9, wherein said two orthogonal directions are horizontal and vertical directions, respectively.

11. A blur-preventing apparatus according to claim 10, wherein said angular velocity detecting means comprises a single sensor which detects the angular velocity in the vertical direction.

12. An apparatus for preventing an image from being blurred in a camera, comprising:
   at least one angular velocity detecting means for detecting the angular velocity applied to the camera; and,
   shutter closing means for sending a closing signal to a shutter of the camera to compulsively close the shutter when an integrated value of the output of the angular velocity detecting means is above a predetermined value after the shutter begins opening.

13. A blur-preventing apparatus according to claim 12, further comprising shutter operation control means for controlling the opening operation of the shutter when the absolute value of the angular velocity detected by the said angular velocity detecting means is below a predetermined value.

14. A blur-preventing apparatus according to claim 13, further comprising detecting means for detecting that the absolute value of the angular velocity detected by said angular velocity detecting means is decreasing, so that said control means opens the shutter when the absolute value of the angular velocity detected by said angular velocity detecting means is decreasing.

15. A blur-preventing apparatus according to claim 13, further comprising detecting means for detecting that the absolute value of the angular velocity detected by said angular velocity detecting means is decreasing, so that said control means opens the shutter when the absolute value of the angular velocity detected by said angular velocity detecting means is below a predetermined value and is decreasing.

16. A blur-preventing apparatus according to claim 15, wherein said angular velocity detecting means comprises a pair of sensors which detect the components of the angular velocity n two orthogonal directions.

17. A blur-preventing apparatus according to claim 16, wherein said two orthogonal directions are horizontal and vertical directions, respectively.

18. A blur-preventing apparatus according to claim 17, wherein said angular velocity detecting means comprises a single sensor which detects the angular velocity in the vertical direction.

19. A blur-preventing apparatus according to claim 18, wherein said angular velocity detecting means comprises at least one angular acceleration detecting sensor which detects the angular acceleration and at least one integration circuit which integrates said output of the angular acceleration detecting sensor.

20. An apparatus for preventing an image from being blurred in a camera, comprising:
   at least one angular velocity detecting means for detecting the angular velocity applied to the camera;
   shutter operation control means for controlling the opening operation of a shutter of the camera when the absolute value of the angular velocity detected by said angular velocity detecting means is below a predetermined value; and
   shutter closing means for sending a closing signal to the shutter to compulsively close the shutter when the absolute value of the angular velocity detected by said angular velocity detecting means is above a predetermined value after the shutter begins opening.

21. An apparatus for preventing an image from being blurred in a camera, comprising:
   at least one angular velocity detecting means for detecting the angular velocity applied to the camera;
   shutter operation control means for controlling the opening operation of a shutter of the camera when the absolute value of the angular velocity detected by said angular velocity detecting means is below a predetermined value;
   first shutter closing means for sending a closing signal to the shutter to compulsively close the shutter when the absolute value of the angular velocity detected by said angular velocity detecting means is above a predetermined value after the shutter begins opening; and
   second shutter closing means for sending a closing signal to the shutter to compulsively close the shutter when an integrated value of the output of said angular velocity detecting means is above a predetermined value.

22. A blur-preventing apparatus according to claim 21, further comprising detecting means for detecting that the absolute value of the angular velocity detected by said angular velocity detecting means is decreasing, so that said control means opens the shutter when the absolute value of the angular velocity detected by said angular velocity detecting means is below a predetermined value and is decreasing.

23. A blur-preventing apparatus according to claim 22, wherein said angular velocity detecting means comprises a pair of sensors which detect the components of the angular velocity in two orthogonal directions.

24. A blur-preventing apparatus according to claim 23, wherein said two orthogonal directions are horizontal and vertical directions, respectively.

25. A blur-preventing apparatus according to claim 24, wherein said angular velocity detecting means comprises a single sensor which detects the angular velocity in the vertical direction.

26. A blur-preventing apparatus according to claim 25, wherein said angular velocity detecting means comprises at least one angular acceleration detecting sensor which detects the angular acceleration and at least one integration circuit which integrates the output of said angular acceleration detecting sensor.

27. An apparatus for preventing an image from being blurred in a camera, comprising:
   at least one motion detecting means for detecting at least one parameter representative of the amount of movement applied to the camera;
   detecting means for detecting whether the magnitude of said at least one parameter is below a predetermined value; and
   control means for controlling a shutter of the camera to be open only during a period starting at a time when the magnitude of said at least one parameter is below a predetermined value and is decreasing.

28. The apparatus according to claim 27, wherein said at least one parameter comprises a value of velocity of the camera.

29. The apparatus according to claim 28, wherein said at least one parameter comprises the angular velocity of the camera.

30. The apparatus according to claim 29, wherein said at least one parameter comprises two values representing, respectively, the velocity of the camera in two different directions.

31. A blur-preventing apparatus according to claim 30, wherein said angular velocity detecting means comprises a pair of sensors which detect the components of the angular velocity in two orthogonal directions.

32. A blur-preventing apparatus according to claim 30, wherein said two orthogonal directions are horizontal and vertical directions.

33. A blur-preventing apparatus according to claim 32, wherein said angular velocity detecting means comprises a single sensor which detects the angular velocity in the vertical direction.

34. An apparatus for preventing an image from being blurred in a camera, comprising:
   at least one motion detecting means for detecting at least one first parameter representative of the amount of movement applied to the camera and at least one second parameter representative of the amount of movement applied to the camera;
   detecting means for detecting whether the magnitude of said at least one first parameter is below a predetermined value and for detecting whether the magnitude of said at least one second parameter is decreasing; and
   control means for controlling a shutter of the camera to be opened during a period starting at a time when the magnitude of said at least one first parameter is below a predetermined value, and the magnitude of said at least one second parameter is decreasing.

35. The apparatus according to claim 34, wherein said at least one first parameter comprises a value of velocity of the camera, and said at least one second parameter comprises a value of acceleration of the camera.

36. The apparatus according to claim 35, wherein said at least one parameter comprises the angular velocity of the camera, and said at least one second parameter comprises the angular acceleration of the camera.

37. The apparatus according to claim 36, wherein said at least one parameter comprises two values representing, respectively, the velocity of the camera in two different directions, and said at least one second parameter comprises two values representing, respectively, the acceleration of the camera in two different directions.

* * * * *

UNITED STATES PATENT AND TRADEMARK OFFICE
CERTIFICATE OF CORRECTION

PATENT NO. : 5,150,150
DATED : September 22, 1992
INVENTOR(S) : S. ENOMOTO

It is certified that error appears in the above-indentified patent and that said Letters Patent is hereby corrected as shown below:

At column 12, line 5 (claim 5, line 5), change "integrate" to ---integrates---.

At column 13, line 9 (claim 16, line 4), change "n" to ---in---.

At column 15, line 6 (claim 36, line 2), after "one" insert ---first---.

At column 16, line 1 (claim 37, line 2), after "one" insert ---first---.

Signed and Sealed this

Seventeenth Day of December, 1996

Attest:

BRUCE LEHMAN

Attesting Officer     Commissioner of Patents and Trademarks